United States Patent
Kagei et al.

(10) Patent No.: US 9,240,595 B2
(45) Date of Patent: Jan. 19, 2016

(54) SPINEL TYPE LITHIUM-MANGANESE-NICKEL-CONTAINING COMPOSITE OXIDE

(71) Applicant: Mitsui Mining & Smelting Co., Ltd., Tokyo (JP)

(72) Inventors: Shinya Kagei, Ageo (JP); Natsumi Shibamura, Ageo (JP); Yanko Marinov Todorov, Ageo (JP); Yoshima Hata, Takehara (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 14/349,157

(22) PCT Filed: Aug. 26, 2013

(86) PCT No.: PCT/JP2013/072697
§ 371 (c)(1),
(2) Date: Apr. 2, 2014

(87) PCT Pub. No.: WO2014/030764
PCT Pub. Date: Feb. 27, 2014

(65) Prior Publication Data
US 2014/0252268 A1    Sep. 11, 2014

(30) Foreign Application Priority Data
Aug. 24, 2012   (JP) .................. 2012-185822

(51) Int. Cl.
| | |
|---|---|
| H01M 4/505 | (2010.01) |
| H01M 4/525 | (2010.01) |
| C01G 53/00 | (2006.01) |
| H01M 10/0525 | (2010.01) |
| C01B 35/10 | (2006.01) |

(52) U.S. Cl.
CPC .............. *H01M 4/525* (2013.01); *C01B 35/10* (2013.01); *C01G 53/00* (2013.01); *C01G 53/44* (2013.01); *C01G 53/54* (2013.01); *H01M 4/505* (2013.01); *H01M 10/0525* (2013.01); *C01P 2002/32* (2013.01); *C01P 2002/72* (2013.01); *C01P 2004/03* (2013.01); *C01P 2004/61* (2013.01); *C01P 2006/12* (2013.01); *C01P 2006/40* (2013.01); *H01M 2220/30* (2013.01); *Y02E 60/122* (2013.01)

(58) Field of Classification Search
None
See application file for complete search history.

(56) References Cited

U.S. PATENT DOCUMENTS

| | | |
|---|---|---|
| 7,179,566 B2 | 2/2007 | Kawasaki et al. |
| 2008/0206643 A1 | 8/2008 | Nakane et al. |
| 2012/0177994 A1 | 7/2012 | Kim et al. |
| 2012/0305835 A1 | 12/2012 | Yamaguchi |

FOREIGN PATENT DOCUMENTS

| | | | |
|---|---|---|---|
| EP | 1035075 A1 | 9/2000 | |
| EP | 1372202 A1 | 12/2003 | |
| EP | 2110872 A1 | 11/2009 | |
| EP | 2477258 A1 | 7/2012 | |
| JP | 1173962 A | 3/1999 | |
| JP | 2000235857 A | 8/2000 | |
| JP | 200263900 A | 2/2002 | |
| JP | 2003197194 A | 7/2003 | |
| JP | 2004241339 A | 8/2004 | |
| JP | 2004281158 A  * | 10/2004 | .............. H01M 4/58 |
| JP | 2009123707 A | 6/2009 | |
| JP | 2012116720 A | 6/2012 | |
| JP | 2012146662 A | 8/2012 | |
| WO | 2011099145 A1 | 8/2011 | |

* cited by examiner

Primary Examiner — Tanisha Diggs
(74) Attorney, Agent, or Firm — The Webb Law Firm

(57) ABSTRACT

Provided is a new 5 V class spinel exhibiting an operating potential of 4.5 V or higher (5 V class) with respect to the Li metal reference potential, having an excellent discharge capacity retention ratio at high temperatures, for example 45° C. Suggested is a spinel type lithium-manganese-nickel-containing composite oxide containing a crystalline phase in which a portion of Mn sites in $LiMn_2O_{4-\delta}$ are substituted with Li; another metal element M1, wherein M1 represents a metal element including at least one of Ni, Co and Fe and another metal element M2, wherein M2 represents a metal element including at least one of Mg, Ti, Al, Ba, Cr and Nb, and the spinel type lithium-manganese-nickel-containing composite oxide comprising a composite oxide phase containing Ni, Mn and B.

2 Claims, 3 Drawing Sheets

SPINEL TYPE LITHIUM-MANGANESE-NICKEL-CONTAINING COMPOSITE OXIDE

CROSS-REFERENCE TO RELATED APPLICATIONS

This application is the United States national phase of International Application No. PCT/JP2013/072697 filed Aug. 26, 2013, and claims priority to Japanese Patent Application No. 2012-185822 filed Aug. 24, 2012, the disclosures of which are hereby incorporated in their entirety by reference.

TECHNICAL FIELD

The present invention relates to a spinel type lithium-manganese-nickel-containing composite oxide that can be used as a cathode active material for lithium secondary batteries, and more particularly, to a spinel type lithium-manganese-nickel-containing composite oxide having an operating potential of 4.5 V or higher with respect to the lithium (Li) metal reference potential (referred to as "5 V class").

BACKGROUND ART

Lithium secondary batteries have features such as high energy density and long service life. Therefore, lithium secondary batteries are widely used as power supplies for electric appliances such as video cameras; portable electronic devices such as laptop computers and mobile telephones; and electric tools such as power tools. Recently, lithium secondary batteries are also applied to large-sized batteries that are mounted in electric vehicles (EV), hybrid electric vehicles (HEV) and the like.

A lithium secondary battery is a secondary battery having a structure in which, at the time of charging, lithium begins to dissolve as ions from the cathode and moves to the anode to be stored therein, and at the time of discharging, lithium ions return from the anode to the cathode, and it is known that the higher energy density of the lithium secondary battery is attributable to the electric potential of the cathode material.

Examples of this kind of cathode active material for lithium secondary batteries include lithium transition metal oxides having lamellar structures, such as $LiCoO_2$, $LiNiO_2$, and $LiMnO_2$; and lithium transition metal oxides having a manganese-based spinel structure (Fd-3m), such as $LiMn_2O_4$ and $LiNi_{0.5}Mn_{1.5}O_4$.

Since manganese-based spinel type lithium transition metal oxides of this kind are provided at low prices of raw materials, are non-toxic and safe, and have properties of being resistant to over-charging, attention is paid to them as the next-generation cathode active material for the large-sized batteries of electric vehicles (EV), hybrid electric vehicles (HEV) and the like. Furthermore, since spinel type lithium transition metal oxides (LMO) that are capable of three-dimensional insertion and release of Li ions have superior power output characteristics compared with lithium transition metal oxides having a lamellar structure such as $LiCoO_2$, much expectation is placed on the use of the spinel type lithium transition metal oxides in the applications where excellent power output characteristic are required, such as in batteries for EV and batteries for HEV.

Among others, it has come to be known that when some of the Mn sites in $LiMn_2O_4$ are replaced by other transition metals (Cr, Co, Ni, Fe, or Cu), the compound acquires an operating potential close to 5 V. Thus, currently, development of a manganese-based spinel type lithium transition metal oxide having an operating potential of 4.5 V or higher (5 V class) is actively underway.

For example, Patent Document 1 discloses, as a cathode active material for lithium secondary batteries exhibiting an electromotive force of 5 V class, a high capacity spinel type lithium-manganese composite oxide cathode active material containing chromium as an essential additive component to spinel type lithium-manganese composite oxide, and further having nickel or cobalt added thereto.

Patent Document 2 discloses a crystal having a spinel structure, $LiMn_{2-y-z}Ni_yM_zO_4$ (provided that M: at least one selected from the group consisting of Fe, Co, Ti, V, Mg, Zn, Ga, Nb, Mo and Cu; and $0.25 \leq y \leq 0.6$, and $0 \leq z \leq 0.1$), which performs charging and discharging at a potential of 4.5 V or higher with respect to Li metal.

Patent Document 3 discloses a spinel type lithium-manganese composite oxide represented by $Li_a(M_xMn_{2-x-y}A_y)O_4$ (wherein $0.4<x$, $0<y$, $x+y<2$, $0<a<1.2$; M includes one or more kinds of metal elements selected from the group consisting of Ni, Co, Fe, Cr and Cu and contains at least Ni; A includes at least one metal element selected from Si and Ti, provided that when A includes only Ti, the value of the proportion y of A is such that $0.1<y$), as a cathode material for lithium ion secondary batteries having a high energy density and having a high voltage of 4.5 V or higher with respect to Li.

Patent Document 4 discloses, as a cathode active material which has a high capacity density by having both the tap density of the cathode active material and the initial discharge capacity of a secondary battery formed by using the cathode active material, a lithium-nickel-manganese composite oxide having a spinel structure represented by formula (I): $Li_{1+x}Ni_{0.5-1/4x-1/4y}Mn_{1.5-3/4x-3/4y}B_yO_4$ (wherein in formula (I), x and y are such that $0 \leq x \leq 0.025$, and $0<y \leq 0.01$), characterized in that the median diameter is 5 μm to 20 μm, the coefficient of variation of particle size is 2.0% to 3.5%, and the BET specific surface area is 0.30 m/g to 1.30 m/g.

CITATION LIST

Patent Document

Patent Document 1: JP 11-73962 A
Patent Document 2: JP 2000-235857 A
Patent Document 3: JP 2003-197194 A
Patent Document 4: JP 2012-116720 A Spinel type lithium-manganese-nickel-containing composite oxides capable of realizing the high energy density lithium ion secondary batteries that have been suggested hitherto, particularly (5 V class) spinel type lithium-manganese-nickel-containing composite oxides having an operating potential of 4.5 V or higher with respect to the Li metal reference potential (referred to as "5 V class spinel"), have a serious problem concerning practical utilization, that the discharge capacity retention ratio during high temperature cycles is generally low.

Thus, it is an object of the present invention to develop and provide a new 5 V class spinel type lithium-manganese-nickel-containing composite oxide having an operation potential of 4.5 V or higher with respect to the Li metal reference potential, the 5 V class spinel type lithium-manganese-nickel-containing composite oxide having an excellent discharge capacity retention ratio during high temperature cycles.

SUMMARY OF THE INVENTION

The present invention is to suggest a spinel type lithium-manganese-nickel-containing composite oxide having an operation potential of 4.5 V or higher with respect to a Li metal reference potential, for example, a spinel type lithium-manganese-nickel-containing composite oxide including a crystalline phase in which a portion of the Mn sites in $LiMn_2O_{4-\delta}$ are substituted with Li, a metal element M1 including Ni (wherein M1 represents a metal element including at least one of Ni, Co and Fe) and another metal element M2 (wherein M2 represents a metal element including at least one of Mg, Ti, Al, Ba, Cr and Nb), and the spinel type lithium-manganese-nickel-containing composite oxide being characterized by including a composite oxide phase containing Ni, Mn and B.

The spinel type lithium-manganese-nickel-containing composite oxide suggested by the present invention not only has an operating potential of 4.5 V or higher with respect to the Li metal reference potential, but also has an excellent discharge capacity retention ratio during high temperature (for example, 45° C.) cycles. Therefore, the spinel type lithium-manganese-nickel-containing composite oxide suggested by the present invention can be suitably used as a cathode active material for various lithium batteries.

BEST MODE(S) FOR CARRYING OUT THE INVENTION

Figure 1:
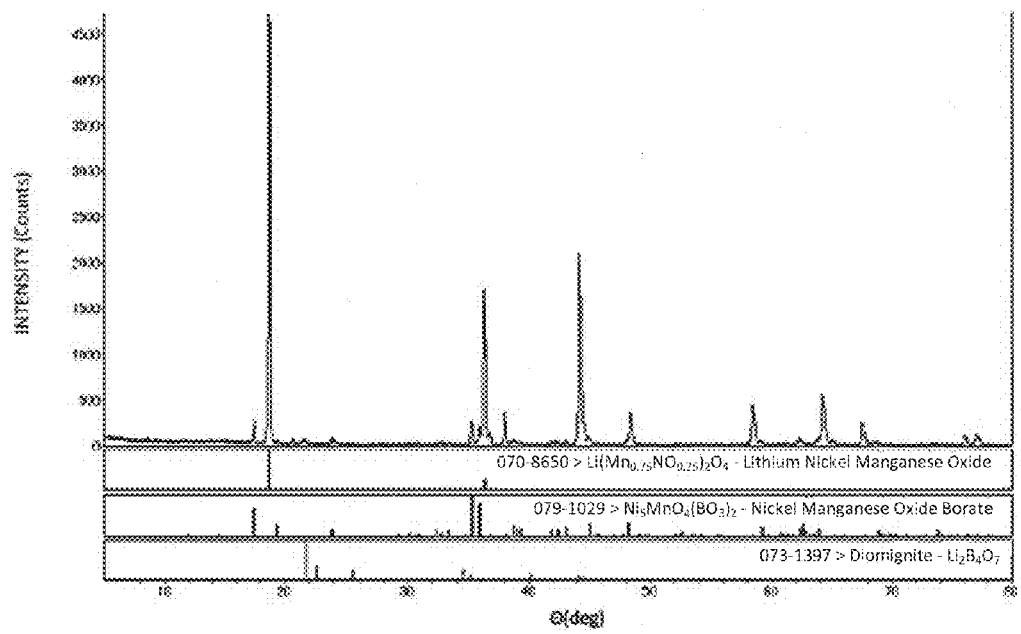
FIG. 1 is an XRD pattern of a spinel type lithium-manganese-nickel-containing composite oxide obtained in Example 8.
Figure 2:
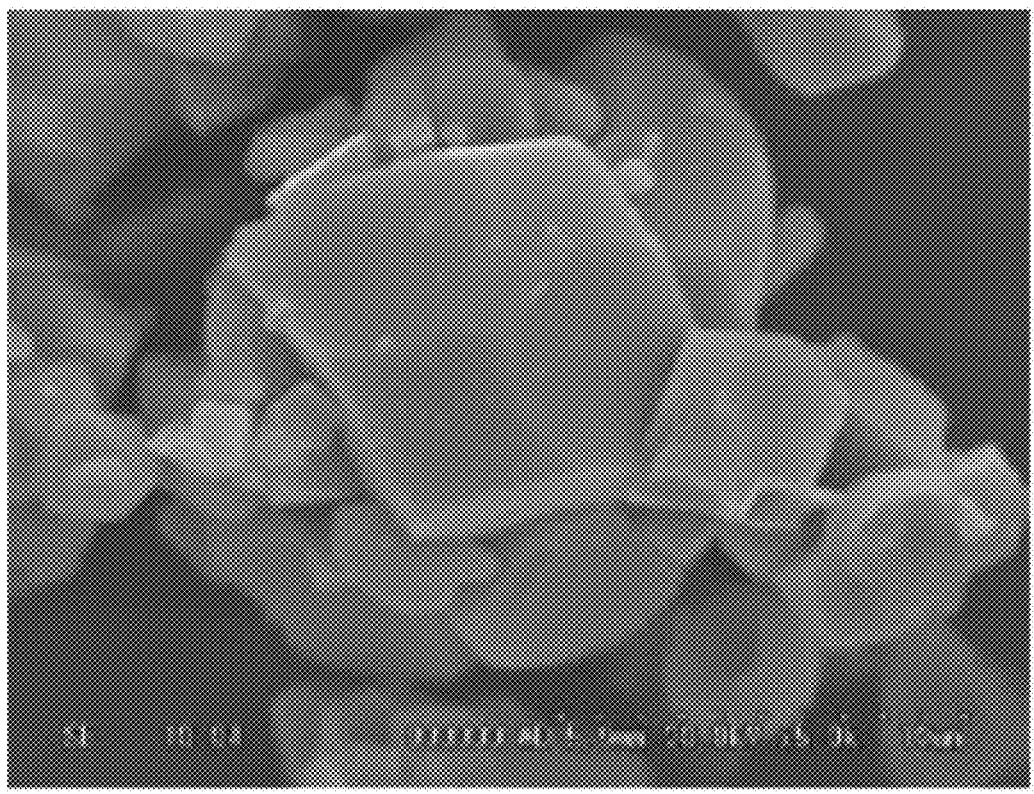
FIG. 2 is a SEM photograph of the spinel type lithium-manganese-nickel-containing composite oxide obtained in Example 8.
Figure 3:
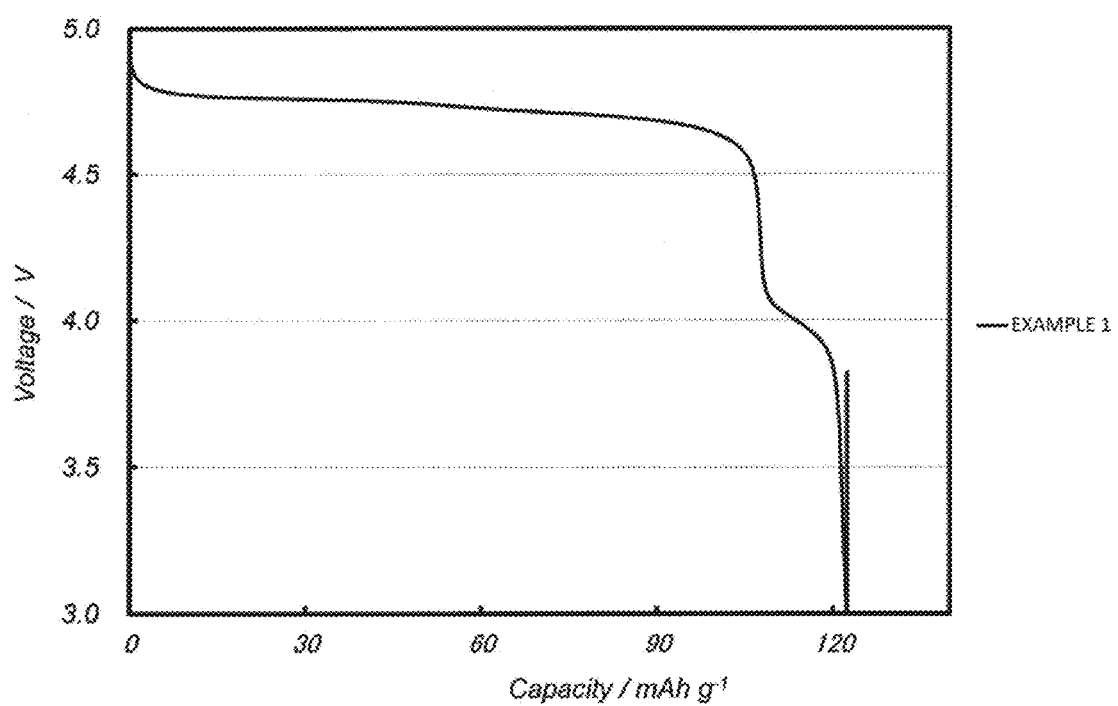
FIG. 3 is a discharge curve obtained when a battery performance evaluation test (first cycle of charging and discharging in an environment at 45° C.) was performed using a spinel type lithium-manganese-nickel-containing composite oxide powder obtained in Example 1.

Next, the present invention will be described in detail based on embodiments for carrying out the present invention. However, the present invention is not intended to be limited to the exemplary embodiments that will be described below.

<Present Spinel Powder>

The spinel type lithium-manganese-nickel-containing composite oxide related to an exemplary embodiment of the present invention is a lithium-manganese-nickel-containing composite oxide having a crystal structure that belongs to the space group Fd-3m, and is a powder containing, as a main component, spinel type lithium-manganese-nickel-containing composite oxide particles including a crystalline phase in which a portion of the Mn sites in $LiMn_2O_{4-\delta}$ are substituted with Li, a metal element M1 including Ni, and another metal element M2 (referred to as "present spinel particles"), characterized by containing a composite oxide phase containing Ni, Mn and B (referred to as "present spinel powder").

Here, the phrase "containing as a main component" implies that, unless particularly stated otherwise, it is allowed to contain other components as long as the function of the relevant main component is not disrupted. The percentage content of the relevant main component is not particularly defined, but the percentage content is preferably at least 70% by mass or more, more preferably 90% by mass or more, and even more preferably 95% by mass or more (including 100%). Therefore, the present spinel powder is allowed to contain components other than the present spinel particles and a composite oxide (phase) including Ni, Mn and B.

Examples of the composite oxide phase containing Ni, Mn and B include a crystalline phase of $Ni_5MnO_4(BO_3)_2$.

Whether the composite oxide includes a crystalline phase of $Ni_5MnO_4(BO_3)_2$ can be confirmed by collating the diffraction pattern obtained by X-ray diffraction (XRD) with PDF (Powder Diffraction File) No. "01-079-1029".

The composite oxide containing Ni, Mn and B is suspected to exist at the surface of the present spinel particles or at the grain boundaries.

In regard to the content of the composite oxide phase containing Ni, Mn and B, it is preferable for the present spinel powder to contain the composite oxide phase such that the content of element B in the present spinel powder is 0.02% to 0.80% by mass, more preferably from 0.05% by mass to 0.60% by mass, and even more preferably from 0.10% by mass to 0.30% by mass. Particularly, it is more preferable for the present spinel powder to contain the composite oxide phase such that the content of element B is 0.25% by mass or less.

When the content of element B is 0.02% by mass or more, the discharge capacity at a high temperature (for example, 45° C.) can be maintained, and when the content of element B is 0.80% by mass or less, the rate characteristics can be maintained, which is preferable.

Furthermore, it is preferable that the present spinel powder contain the composite oxide phase containing Ni, Mn and B such that the molar ratio of the content (number of moles) of the content (number of moles) of element B with respect to the metal element M2 (for example, Ti) is 0.01 to 0.4, and among others, it is more preferable that the present spinel powder contain the composite oxide phase such that the molar ratio is from 0.02 to 0.3, and among others, from 0.03 to 0.2. When the relevant molar ratio of element B is 0.01 or greater, the discharge capacity at a high temperature (for example, 45° C.) can be maintained, and when the relevant molar ratio of element B is 0.4 or less, a decrease in the initial capacity is suppressed, which is preferable.

The metal element M1 is a substituent element that mainly contributes to the manifestation of an operating potential of 4.5 V or higher with respect to the Li metal reference potential, and examples include Ni, Co and Fe. It is acceptable if the metal element M1 includes Ni as an essential component and optionally includes at least one of Co and Fe, and M1 may also include other metal elements.

Furthermore, the content of Ni is preferably 2.5 times or more of the content of boron (B).

The metal element M2 is a substituent element that mainly contributes to stabilization of the crystal structure and enhancement of the characteristics, and examples of a substituent element that contributes to an increase of the capacity retention ratio include, for example, Mg, Ti, Al, Ba, Cr and Nb. It is acceptable if the metal element M2 includes at least one of these Mg, Ti, Al, Ba, Cr and Nb, and M2 may also include other metal elements.

Among them, when the metal element M2 includes at least Ti, it is preferable that the present spinel powder contain the composite oxide phase containing Ni, Mn and B so as to contain element B at a proportion of 0.3% to 15.0% by mass relative to the content of Ti, and among others, it is more preferable that the present spinel powder contain the composite oxide phase so as to contain element B at a proportion of from 1.0% by mass to 12.0% by mass, and even more preferably from 1.5% by mass to 10.0% by mass.

When the present spinel powder contains element B at a proportion of 0.3% by mass or more relative to the content of Ti, the discharge capacity at a high temperature (for example, 45° C.) can be maintained, and when the present spinel powder contains element B at a proportion of 15.0% by mass or less, a decrease in the initial capacity is suppressed, which is preferable.

An example of the present spinel particles may be a spinel type lithium-manganese-nickel-containing composite oxide represented by formula (I): $Li[Li_aMn_{2-a-c}M1_bM2_c]O_{4-\delta}$.

In the above formula (I), the value of "a" may be 0.00 to 1.0, and among others, "a" is more preferably from 0.01 to 0.5, and even more preferably from 0.02 to 0.33.

The value of "b" that represents the content of M1 may be 0.30 to 0.70, and among others, "b" is more preferably from 0.35 to 0.60, and even more preferably from 0.40 to 0.60.

The value of "c" that represents the content of M2 may be 0.001 to 0.400, and among others, "c" is more preferably from 0.002 to 0.100, and even more preferably from 0.005 to 0.050.

Meanwhile, the term "4-$\delta$" in the various formulas implies that the composite oxide may also contain oxygen deficiency, and a portion of oxygen may be substituted with fluorine.

However, the present spinel particles may contain other components as long as the functions of Li, Mn, M1, M2 and O are not completely disrupted. Particularly, the present spinel particles may contain those other elements respectively at a proportion of 0.5% by weight or less. It is because if the content is this much amount, it may be considered that the other elements would hardly affect the performance of the present spinel particles.

(D50)

The present spinel powder is such that the D50 value based on the volume-based particle size distribution obtainable by making an analysis by a laser diffraction scattering type particle size distribution analysis method is preferably 5 μm to 40 μm, and more preferably from 10 μm to 40 μm, and among others, the D50 value is particularly preferably from 13 μm to 30 μm.

When the D50 value of the present spinel powder is 5 μm to 40 μm, it is convenient from the viewpoint of electrode production.

As such, in order to adjust the D50 value of the present spinel powder to the range described above, the calcination conditions (temperature, time, atmosphere and the like) or the crushing strength after calcination (the speed of rotation of a crushing machine or the like) may be adjusted. However, the way of adjustment is not intended to be limited to these methods.

(Ratio of D50 with Respect to Primary Particle Size)

The present spinel powder is such that the ratio of the D50 value with respect to the average size of the primary particles is preferably 1.0 to 6.0, and among others, the ratio is more preferably from 1.0 to 5.0, even more preferably from 1.0 to 4.0, still more preferably from 1.0 to 3.0, and still more preferably from 1.0 to 2.0.

When the ratio of the D50 value with respect to the average size of the primary particles is 6.0 or less, the primary particles are sufficiently large, and since the primary particles approach monodispersity, an effect of suppressing the reaction of the primary particles with a liquid electrolyte or the like can be obtained. On the other hand, when the ratio of the average size of the secondary particles with respect to the average size of the primary particles is 1.0 to 3.0, the particles are substantially monodisperse, and a state close to ideality from the viewpoint of suppressing reactivity is attained.

As such, in order to adjust the ratio of the average size of the secondary particles with respect to the average size of the primary particles to the range described above, the calcination conditions (temperature, time, atmosphere and the like) or the crushing strength after calcination (the speed of rotation of a crushing machine or the like) may be adjusted. However, the way of adjustment is not intended to be limited to these methods.

Meanwhile, the "primary particles" as used in the present invention means particles of the smallest unit that are surrounded by grain boundaries when observed by SEM (scanning electron microscopy, for example, 500 to 5000 times). Unless particularly stated otherwise, the "present spinel particles" mean primary particles.

Regarding the average size of the primary particles, the "average size of primary particles" can be determined by making an observation by SEM (scanning electron microscopy, for example, 500 to 5000 times); selecting arbitrary 30 primary particles; calculating the primary particle sizes by the procedure of measuring the major axis (μm) and the minor axis (μm) of each primary particle, and dividing the sum of the major axis and the minor axis by 2; and averaging the primary particle sizes of 30 particles.

On the other hand, the "secondary particles" according to the present invention mean particles in which plural primary particles are aggregated so as to share portions of the outer peripheries (grain boundaries) of the respective particles, and are segregated from other particles.

The D50 value based on the volume-based particle size distribution obtainable by making an analysis by a laser diffraction scattering type particle size distribution analysis method, has a meaning as a substitute value of the average size of particles including these primary particles and secondary particles.

(Specific Surface Area)

The specific surface area of the present spinel particles is preferably 1.00 $m^2/g$ or less, and among others, the specific surface area is more preferably 0.10 $m^2/g$ or more and 0.90 $m^2/g$ or less, even more preferably 0.80 $m^2/g$ or less, still more preferably 0.50 $m^2/g$ or less, and still more preferably 0.40 $m^2/g$ or less. Moreover, the specific surface area is even more preferably 0.30 $m^2/g$ or less.

In general, it is technical common knowledge that when the specific surface area increases, the reactivity with a liquid electrolyte increases, and the capacity retention ratio is decreased. However, the present spinel powder is characterized in that despite having a specific surface area equivalent to that of conventional spinel type lithium-manganese-nickel-containing composite oxides, the reaction of the present spinel powder with a liquid electrolyte can be suppressed, and the present spinel powder has an excellent discharge capacity retention ratio.

<Method for Producing Present Spinel Powder>

The present spinel powder can be obtained by mixing raw materials, for example, raw materials such as a lithium salt compound, a manganese salt compound, a M1 metal salt compound, a M2 metal salt compound and a boron (B) compound, pulverizing the mixture using a wet pulverizing machine or the like, subsequently granulating and drying the pulverization product using a thermal spray dryer or the like, calcining the dried granules, heat-treating the granules as necessary, and if necessary, classifying the granules. However, the method for producing the present spinel powder is not intended to be limited to such a production method. For example, a granulated powder that is supplied to calcination may also be produced according to a so-called co-precipitation method.

Examples of the lithium salt compound include lithium hydroxide (LiOH), lithium carbonate ($Li_2CO_3$), lithium nitrate ($LiNO_3$), $LiOH.H_2O$, lithium oxide ($Li_2O$), other fatty acid lithium compounds, and lithium halides. Among them, hydroxide, carbonate and nitrate of lithium are preferred.

There are no particular limitations on the manganese salt compounds. For example, manganese carbonate, manganese nitrate, manganese chloride, manganese dioxide, dimanganese trioxide, and trimanganese tetraoxide can be used, and among others, manganese carbonate and manganese dioxide are preferred. Among them, electrolytic manganese dioxide obtainable according to an electrolysis method is particularly preferred.

Regarding the M1 metal salt compound and the M2 metal salt compound, carbonates, nitrates, chlorides, oxyhydroxides, hydroxides and the like of M1 or M2 metals can be used.

Regarding the boron compound, any compound containing boron (element B) may be used. For example, it is preferable to use boric acid or lithium borate. Regarding lithium borate, compounds of various forms, such as lithium metaborate ($LiBO_2$), lithium tetraborate ($Li_2B_4O_7$), lithium pentaborate ($LiB_5O_8$) and lithium perborate ($Li_2B_2O_5$), can be used.

Mixing of the raw materials is preferably carried out by wet mixing by adding a liquid medium such as water or a dispersant, and forming a slurry, and the slurry thus obtained is preferably pulverized with a wet pulverizer. However, it is also acceptable to carry out dry pulverization.

Then, it is preferable to pulverize the resulting product such that the average particle size (D50) is 0.2 μm to 1.0 μm.

The granulation method may be a wet method or a dry method as long as the various raw material pulverized in the previous process are dispersed in the granulated particles without being separated, and an extrusion granulation method, a rolling granulation method, a fluidized bed granulation method, a mixing granulation method, a spray drying granulation method, a pressure molding granulation method, or a flake granulation method using a roll or the like may be used. However, when wet granulation is carried out, it is necessary to sufficiently dry the granulated particles before calcination. Regarding the drying method, drying may be carried out according to known drying methods such as a spray heat drying method, a hot air drying method, a vacuum drying method, and a freeze drying method, and among others, a spray heat drying method is preferred. The spray heat drying method is preferably carried out using a thermal spray drying machine (spray dryer).

In regard to calcination, calcination is preferably carried out such that the present spinel powder is retained at a temperature of 800° C. to 1000° C., and preferably 900° C. to 1000° C. (: meaning the temperature when a thermocouple is brought into contact with a calcination product in a calcining furnace), for 0.5 hours to 300 hours in an air atmosphere, in an atmosphere with an adjusted oxygen partial pressure, in a carbon dioxide gas atmosphere, or in an atmosphere other than that in the calcining furnace. At this time, it is preferable to select the calcination conditions in which transition metals are dissolved in a solid state at an atomic level, and a single phase is exhibited.

The kind of the calcining furnace is not particularly limited. For example, calcination can be carried out using a rotary kiln, a static furnace, or a calcining furnace other than those.

The heat treatment is preferably carried out in an environment at 500° C. to 800° C., and preferably from 700° C. to 800° C., in an air atmosphere, such that oxygen is easily incorporated every 0.5 to 300 hours. At this time, if the temperature is a temperature lower than 700° C., the effect of the heat treatment is not easily obtained, and there is a risk that it may not be feasible to incorporate oxygen. On the other hand, when the heat treatment is carried out at a temperature higher than 800° C., desorption of oxygen begins, and the effect intended by the present invention cannot be obtained.

<Use of Present Spinel Powder>

The present spinel powder can exhibit an operating potential of 4.5 V or higher (5 V class) with respect to the Li metal reference potential, and has an excellent discharge capacity retention ratio during high temperature (for example, 45° C.) cycles.

Therefore, the present spinel powder can be effectively used as a cathode active material for various lithium batteries, for example, after being crushed and classified as necessary.

In the case of using the present spinel powder as a cathode active material for various lithium batteries, a cathode mixture can be produced by mixing, for example, the present spinel powder, a conductive material formed from carbon black or the like, and a binder formed from a TEFLON (registered trademark) binder or the like. Then, a lithium battery can be configured by using such a cathode mixture in the cathode, using lithium or a material capable of storing and releasing lithium, such as carbon, in the anode, and using a solution obtained by dissolving a lithium salt such as lithium hexafluorophosphate ($LiPF_6$) in a mixed solvent such as ethylene carbonate-dimethyl carbonate.

A lithium battery configured as such can be used as, for example, a driving power supply for electronic devices such as laptop computers, mobile telephones, cordless telephone handsets, video movies, liquid crystal TV's, electric shavers, portable radios, headphone stereo cassette tape recorders, backup power supplies, and memory cards; medical devices such as pacemakers and hearing aids; and electric vehicle installation. Among them, the lithium battery is particularly effective as a driving power supply for mobile telephones; various portable computers such as PDA's (portable information terminals) or laptop computers, electric vehicles (including hybrid vehicles), and power supplies for electric power storage.

DESCRIPTION ON TERMS

When the expression "X to Y" (wherein X and Y are arbitrary numbers) is used in the present specification, unless particularly stated otherwise, the expression includes the meaning of "from X to Y", as well as the meaning of "preferably greater than X" or "preferably less than Y".

Furthermore, when the expression "X or more" (wherein X is an arbitrary number) or "Y or less" (wherein Y is an arbitrary number) is used, the expression also includes the meaning intended for "preferably more than X" or "preferably less than Y".

Also, the various numerical value ranges defined in the present invention includes, unless particularly stated otherwise, a range that is included in the ranges of the upper limit and the lower limit when the numerical values are rounded. However, the numerical value range is preferably within the range of numerical values each with the digit below the significant figure being dropped.

EXAMPLES

Next, the present invention will be described in more detail by way of Examples and Comparative Example. However, the present invention is not intended to be limited to Examples to be described below.

Example 1

Lithium carbonate, electrolytic manganese dioxide, nickel hydroxide, titanium oxide, and lithium tetraborate ($Li_2B_4O_7$) were weighed according to the molar ratio described in Table 3 (see Table 1 for the amounts of incorporation), water was added thereto, and the mixture was mixed and stirred. Thus, a slurry having a solid content concentration of 10 wt. % was prepared.

To the slurry (500 g of raw material powder) thus obtained, a polycarboxylic acid ammonium salt (manufactured by San Nopco, Ltd., SN DISPERSANT 5468) as a dispersant was added at a proportion of 6 wt. % of the slurry solid content, and the mixture was pulverized with a wet pulverizer at 1300 rpm for 20 minutes. Thus, the particles were processed to obtain an average particle size (D50) of 0.5 μm or less.

The pulverized slurry thus obtained was granulated and dried using a thermal spray drying machine (spray dryer, "i-8" manufactured by Ohkawara Kakohki Co., Ltd.). At this time, granulation and drying was carried out using a rotating disk for the spraying, at a speed of rotation of 24000 rpm and a slurry supply amount of 12 kg/hr, by regulating the temperature such that the exit temperature at the drying column would be 100° C.

The granulated powder thus obtained was calcined at 950° C. for 70 hours in air using a static electric furnace, and then was heat treated at 700° C. for 70 hours in air. The calcined powder thus obtained by heat treating was classified with a sieve having a mesh size of 75 μm, and thus a spinel type lithium-manganese-nickel-containing composite oxide powder (sample) was obtained.

TABLE 1

| | Mixing ratio | | | | | |
|---|---|---|---|---|---|---|
| | Moles | | | | | Number of moles |
| | Li | Mn | Ni | Ti | Al | B |
| Comparative Example 1 | 1.04 | 1.32 | 0.44 | 0.20 | None | None |
| Example 1 | 1.04 | 1.33 | 0.48 | 0.20 | None | 0.014 |
| Example 2 | 1.04 | 1.33 | 0.48 | 0.20 | None | 0.014 |
| Example 3 | 1.04 | 1.33 | 0.48 | 0.20 | None | 0.014 |
| Example 4 | 1.04 | 1.33 | 0.48 | 0.20 | None | 0.014 |
| Example 5 | 1.04 | 1.32 | 0.44 | 0.20 | None | 0.014 |
| Example 6 | 1.04 | 1.32 | 0.46 | 0.20 | None | 0.007 |
| Example 7 | 1.04 | 1.33 | 0.50 | 0.20 | None | 0.024 |
| Example 8 | 1.04 | 1.36 | 0.62 | 0.20 | None | 0.071 |
| Example 9 | 1.04 | 1.32 | 0.44 | 0.20 | None | 0.002 |
| Example 10 | 1.04 | 1.35 | 0.58 | 0.20 | None | 0.056 |
| Example 11 | 1.04 | 1.34 | 0.45 | 0.20 | 0.01 | 0.014 |
| Example 12 | 1.04 | 1.34 | 0.47 | 0.19 | 0.01 | 0.014 |
| Example 13 | 1.03 | 1.40 | 0.41 | 0.16 | None | 0.014 |
| Example 14 | 1.01 | 1.42 | 0.49 | 0.06 | 0.02 | 0.014 |
| Example 15 | 1.01 | 1.43 | 0.51 | 0.05 | 0.01 | 0.009 |
| Example 16 | 1.01 | 1.42 | 0.50 | 0.05 | 0.01 | 0.005 |

Comparative Example 1

A spinel type lithium-manganese-nickel-containing composite oxide powder (sample) was obtained in the same manner as in Example 1, except that lithium carbonate, electrolytic manganese dioxide and nickel hydroxide were weighed so as to obtain the molar ratio indicated in Table 3, and lithium tetraborate ($Li_2B_4O_7$) was not incorporated.

Examples 2 to 4

Spinel type lithium-manganese-nickel-containing composite oxide powders (samples) were obtained in the same manner as in Example 1, except that the calcination temperature was changed to 850° C. in Example 2, 900° C. in Example 3, and 970° C. in Example 4.

Example 5

A spinel type lithium-manganese-nickel-containing composite oxide powder (sample) having a D50 value of 10 μm was obtained by pulverizing the spinel type lithium-manganese-nickel-containing composite oxide powder (sample) obtained in Example 1.

Examples 6 to 10

Spinel type lithium-manganese-nickel-containing composite oxide powders (samples) were obtained in the same manner as in Example 1, except that the amount of incorporation of lithium tetraborate ($Li_2B_4O_7$) was changed while regulating the amount of incorporation such that the same molar ratio as that of the spinel type lithium-manganese-nickel-containing composite oxide powder (sample) obtained in Example 1 would be obtained.

Examples 11 and 12

Spinel type lithium-manganese-nickel-containing composite oxide powders (samples) were obtained in the same manner as in Example 1, except that the mixing composition of the raw materials was appropriately changed to obtain the molar ratios indicated in Table 3.

Incidentally, in the specification of the initial patent application of priority, the unit indicated in Table 1 was wt. %, but it was a clerical error. Correctly speaking, the values described for Li, Mn, Ni and Ti was molar ratios. In regard to B, the value was the number of moles of B in 100 g of the spinel type lithium-manganese-nickel-containing composite oxide obtained as described above.

Example 13

A spinel type lithium-manganese-nickel-containing composite oxide powder (sample) was obtained in the same manner as in Example 1, except that the mixing composition of the raw materials was appropriately changed to obtain the molar ratio indicated in Table 3, and the calcination temperature was set to 880° C.

Example 14

A spinel type lithium-manganese-nickel-containing composite oxide powder (sample) was obtained in the same manner as in Example 13, except that the mixing composition of the raw materials was appropriately changed to obtain the molar ratio indicated in Table 3.

Examples 15 and 16

Spinel type lithium-manganese-nickel-containing composite oxide powders (samples) were obtained in the same manner as in Example 14, except that the amount of incorporation of lithium tetraborate ($Li_2B_4O_7$) was changed while regulating the amount of incorporation such that the same molar ratio as that of the spinel type lithium-manganese-nickel-containing composite oxide powder (sample) obtained in Example 14 would be obtained.

<Chemical Analysis>

The spinel type lithium-manganese-nickel-containing composite oxide powders (samples) obtained in Examples and Comparative Example were submitted to an ICP analysis, and the contents of the various elements were measured. The results of the measurement are presented in Table 2. For the measurement, SPS-3520V manufactured by SII Nanotechnology, Inc. was used, and the measurement wavelength of the Li analytic radiation used was 610.362 nm.

Furthermore, in Table 3, it was assumed that boron (B) existed as $Ni_5MnO_4(BO_3)_2$ compound, and the results show the composition ratios as the 5 V class spinel type lithium-manganese-nickel-containing composite oxides exhibiting an operating potential of 4.5 V or higher (5 V class) with respect to the Li metal reference potential, from the contents of remaining Ni and Mn excluding the proportions of Ni and Mn corresponding to the $Ni_5MnO_4(BO_3)_2$ compound that was assumed to exist and the contents of Li, Ti, and Al.

TABLE 2

| | Analytic value (wt. %) | | | | | | B/Ti |
|---|---|---|---|---|---|---|---|
| | Li | Mn | Ni | Ti | Al | B | wt. % |
| Comparative Example 1 | 4.01 | 40.47 | 14.42 | 5.35 | <0.01 | <0.01 | 0.0 |
| Example 1 | 3.94 | 40.13 | 15.49 | 5.27 | <0.01 | 0.14 | 2.7 |
| Example 2 | 3.94 | 40.13 | 15.49 | 5.27 | <0.01 | 0.14 | 2.7 |
| Example 3 | 3.94 | 40.13 | 15.49 | 5.27 | <0.01 | 0.14 | 2.7 |
| Example 4 | 3.94 | 40.13 | 15.49 | 5.27 | <0.01 | 0.14 | 2.7 |
| Example 5 | 4.01 | 40.47 | 14.42 | 5.35 | <0.01 | 0.14 | 2.6 |
| Example 6 | 3.98 | 40.21 | 14.98 | 5.32 | <0.01 | 0.07 | 1.3 |
| Example 7 | 3.92 | 39.87 | 16.03 | 5.23 | <0.01 | 0.26 | 5.0 |
| Example 8 | 3.94 | 41.04 | 20.00 | 5.27 | <0.01 | 0.77 | 14.6 |
| Example 9 | 3.98 | 40.21 | 14.33 | 5.32 | <0.01 | 0.02 | 0.4 |
| Example 10 | 3.92 | 40.47 | 18.59 | 5.23 | <0.01 | 0.60 | 11.5 |
| Example 11 | 3.74 | 38.30 | 13.75 | 4.99 | 0.14 | 0.14 | 2.8 |
| Example 12 | 4.00 | 41.02 | 15.39 | 5.08 | 0.15 | 0.14 | 2.8 |
| Example 13 | 3.64 | 39.28 | 12.32 | 3.90 | <0.01 | 0.14 | 3.6 |
| Example 14 | 4.00 | 44.89 | 16.60 | 1.53 | 0.29 | 0.14 | 9.2 |
| Example 15 | 4.01 | 45.20 | 17.09 | 1.50 | 0.23 | 0.09 | 6.0 |
| Example 16 | 4.01 | 45.00 | 17.03 | 1.45 | 0.23 | 0.05 | 3.4 |

TABLE 3

| | Composition (molar ratio) | | | | | Content of B wt. % | Moles of B/M2 Molar ratio |
|---|---|---|---|---|---|---|---|
| | Li | Mn | Ni | Ti | Al | | |
| Comparative Example 1 | 1.04 | 1.32 | 0.44 | 0.20 | | 0 | 0.00 |
| Example 1 | 1.04 | 1.32 | 0.44 | 0.20 | | 0.14 | 0.07 |
| Example 2 | 1.04 | 1.32 | 0.44 | 0.20 | | 0.14 | 0.07 |
| Example 3 | 1.04 | 1.32 | 0.44 | 0.20 | | 0.14 | 0.07 |
| Example 4 | 1.04 | 1.32 | 0.44 | 0.20 | | 0.14 | 0.07 |
| Example 5 | 1.04 | 1.32 | 0.44 | 0.20 | | 0.14 | 0.07 |
| Example 6 | 1.04 | 1.32 | 0.44 | 0.20 | | 0.07 | 0.03 |
| Example 7 | 1.04 | 1.32 | 0.44 | 0.20 | | 0.26 | 0.13 |
| Example 8 | 1.04 | 1.32 | 0.44 | 0.20 | | 0.77 | 0.37 |
| Example 9 | 1.04 | 1.32 | 0.44 | 0.20 | | 0.02 | 0.01 |
| Example 10 | 1.04 | 1.32 | 0.44 | 0.20 | | 0.60 | 0.29 |
| Example 11 | 1.04 | 1.33 | 0.42 | 0.20 | 0.01 | 0.14 | 0.06 |
| Example 12 | 1.04 | 1.33 | 0.43 | 0.19 | 0.01 | 0.14 | 0.07 |
| Example 13 | 1.03 | 1.40 | 0.41 | 0.16 | | 0.14 | 0.08 |
| Example 14 | 1.01 | 1.42 | 0.49 | 0.06 | 0.02 | 0.14 | 0.17 |
| Example 15 | 1.01 | 1.43 | 0.49 | 0.05 | 0.01 | 0.09 | 0.12 |
| Example 16 | 1.01 | 1.42 | 0.50 | 0.05 | 0.01 | 0.05 | 0.07 |

<Method for Measuring Various Property Values>

The various property values of the spinel type lithium-manganese-nickel-containing composite oxide powders (samples) obtained in Examples and Comparative Example were measured as follows.

(Specific Surface Area)

The specific surface areas of the spinel type lithium-manganese-nickel-containing composite oxide powders (samples) obtained in Examples and Comparative Example were measured as follows. The results are presented in Table 4.

First, 0.5 g of a sample (powder) was weighed in a glass cell for a fluidized bed gas adsorption type specific surface area analyzer, MONOSORB LOOP (product name: "MS-18" manufactured by Yuasa Ionics, Inc.). In a pretreatment apparatus for MONOSORB LOOP, the interior of the glass cell was purged with nitrogen gas for 5 minutes at a gas flow rate of 30 mL/min, and then a heat treatment was carried out at 250° C. for 10 minutes in the nitrogen gas atmosphere. Thereafter, the sample (powder) was analyzed by a one-point BET method using the MONOSORB LOOP.

Meanwhile, for the adsorbing gas at the time of measurement, a mixed gas of 30% of nitrogen and 70% of helium was used.

(XRD Analysis)

The XRD analysis was carried out using apparatus name: "D8 ADVANCE" manufactured by Bruker AXS Analytical Instruments PVT Ltd. under the conditions described below, and thus an XRD pattern was obtained.

=XRD Analysis Conditions=

Radiation source: CuKα, Operation axis: 2θ/θ, analysis method: continuous, coefficient unit: cps, Initiation angle: 10°, completion angle: 120°,
Detector: PSD
Detector Type: VANTEC-1
High Voltage: 5585 V
Discr. Lower Level: 0.35 V
Discr. Window Width: 0.15 V
Grid Lower Level: 0.075 V
Grid Window Width: 0.524 V
Flood Field Correction: Disabled
Primary radius: 250 mm
Secondary radius: 250 mm
Receiving slit width: 0.1436626 mm
Divergence angle: 0.3°
Filament Length: 12 mm
Sample Length: 25 mm
Receiving Slit Length: 12 mm
Primary Sollers: 2.623°
Secondary Sollers: 2.623°
Lorentzian, 1/Cos: 0.004933548Th However, for Examples 13 to 16, the analysis was carried out by setting the "Discr. Window Width" to 0.25 V in order to further increase accuracy.

<Measurement of Average Size of Primary Particles>

The average sizes of primary particles of the spinel type lithium-manganese-nickel-containing composite oxide powders (samples) obtained in Examples and Comparative Examples were measured as follows.

A sample (powder) was observed at a magnification ratio of 500 to 5000 times using SEM (scanning electron microscopy), 30 primary particles were randomly selected, and the primary particle sizes were calculated by the procedure of measuring the major axis (μm) and the minor axis (μm) of each primary particle, and dividing the sum of the major axis and the minor axis by 2. The average value of 30 primary particle sizes was calculated as the average size of primary particles, and the results are presented in Table 4.

<Measurement of D50>

For each of the spinel type lithium-manganese-nickel-containing composite oxide powders (samples) obtained in Examples and Comparative Examples, a sample (powder) was introduced into a water-soluble solvent using an automatic sample supplier for laser diffraction particle size distribution analyzer ("MICROTRAC SDC" manufactured by Nikkiso Co., Ltd.), and the sample was irradiated for 360 seconds with ultrasonic waves at 40 W at a 40% flow rate. Subsequently, the particle size distribution was measured using a laser diffraction particle size distribution analyzer "MT3000II" manufactured by Nikkiso Co., Ltd., and the D50 value was determined from a chart of the volume-based particle size distribution thus obtained. The results are presented in Table 4.

Meanwhile, at the time of measurement, the water-soluble solvent was filtered through a filter having a pore size of 60 μm, and the average value obtained by making two measurements under the conditions of a solvent refractive index of 1.33, penetration for the particle penetrability conditions, a particle refractive index of 2.46, a non-spherical shape, a measurement range of 0.133 μm to 704.0 μm, and a measurement time of 30 seconds, was defined as D50.

<Battery Evaluation>

2032 type coin batteries were produced using the spinel type lithium-manganese-nickel-containing composite oxide powders (samples) produced in Examples and Comparative Example as cathode active materials, and a battery performance evaluation test described below was carried out using these coin batteries.

(Production of Coin Battery)

89 wt. % of each of the spinel type lithium-manganese-nickel-containing composite oxide powders (samples) produced in Examples and Comparative Example, 5 wt. % of acetylene black as an auxiliary conductive material, and 6 wt. % of PVDF as a binding material were mixed, and NMP (N-methylpyrrolidone) was added thereto to prepare the mixture in a paste form. This paste was applied on an Al foil current collector having a thickness of 15 μm, and the paste was dried at 120° C. Thereafter, the assembly was pressed to a thickness of 80 μm, and thus a cathode sheet was produced.

A copper foil having a thickness of 18 μm was used as an anode current collector. As an active material, 92 wt. % of graphite and 8 wt. % of PVDF as a binding material were mixed, and NMP was added thereto to prepare the mixture in a paste form. This paste was uniformly applied on the anode current collector, and the paste was dried at 100° C. Thereafter, the assembly was pressed to a thickness of 80 μm, and thus an anode sheet was produced.

A cathode was produced by punching the cathode sheet obtained as described above to a size of φ13, and an anode was produced by punching the anode sheet obtained as described above to a size of φ14. A separator (manufactured by a porous polyethylene film) impregnated with a liquid electrolyte obtained by dissolving $LiPF_6$ in a carbonate-based mixed solvent to a concentration of 1 mol/L, was interposed between the cathode and the anode, and thus a 2032 type coin battery was produced.

(Battery Performance Evaluation Test)

Charging and discharging was carried out using the 2032 coin batteries produced by the method described above, and the discharge capacity retention ratios at 45° C. were evaluated as follows.

(Number of Cycles for Maintaining 80% Discharge Capacity at 45° C.)

A coin battery was subjected to 3 charge-discharge cycles at 25° C. with a current value of 0.1 C, and thereafter, the charge-discharge performance at 0.5 C was evaluated in an environment at 45° C.

The charging-discharging voltage range was set to 3.0 V to 4.9 V. The number of cycles for the discharge capacity to reach 80% of the discharge capacity of the first charge-discharge cycle in an environment at 45° C. (number of cycles for maintaining 80% discharge capacity) was determined, and the results are presented in Table 4.

TABLE 4

|  | D50 | Primary particles | D50/primary particles | Specific surface area | Number of cycles |
|---|---|---|---|---|---|
| Comparative Example 1 | 24 | 5 | 4.8 | 0.21 | 150 |
| Example 1 | 24 | 14 | 1.7 | 0.17 | 220 |
| Example 2 | 24 | 5 | 4.8 | 0.23 | 185 |
| Example 3 | 24 | 9 | 2.7 | 0.21 | 215 |
| Example 4 | 24 | 18 | 1.3 | 0.15 | 220 |
| Example 5 | 10 | 8 | 1.3 | 0.44 | 200 |
| Example 6 | 24 | 11 | 2.2 | 0.19 | 200 |
| Example 7 | 28 | 22 | 1.3 | 0.17 | 225 |
| Example 8 | 28 | 24 | 1.2 | 0.26 | 230 |
| Example 9 | 24 | 6 | 4 | 0.2 | 190 |
| Example 10 | 27 | 23 | 1.2 | 0.23 | 230 |
| Example 11 | 24 | 12 | 2 | 0.17 | 220 |
| Example 12 | 24 | 12 | 2 | 0.18 | 220 |
| Example 13 | 18 | 10 | 1.8 | 0.25 | 200 |
| Example 14 | 18 | 8 | 2.3 | 0.22 | 200 |
| Example 15 | 17 | 7 | 2.4 | 0.21 | 190 |
| Example 16 | 17 | 6 | 2.8 | 0.21 | 185 |

DISCUSSION

It was confirmed that the spinel type lithium-manganese-nickel-containing composite oxide powders (samples) obtained in Examples 1 to 16 have an operating potential of 4.5 V or higher with respect to the Li metal reference potential.

The XRD patterns of these spinel type lithium-manganese-nickel-containing composite oxide powders (samples) obtained in Examples 1 to 16 were collated with PDF (Powder Diffraction File) No. "01-079-1029", and as a result, it was confirmed that the composite oxide powders each contained a crystalline phase of $Ni_5MnO_4(BO_3)_2$.

Further, it was found that as such, the spinel type lithium-manganese-nickel-containing composite oxide particles (Examples 1 to 16) each containing a crystalline phase of $Ni_5MnO_4(BO_3)_2$ have excellent discharge capacity retention ratios at high temperatures (for example, 45° C.), compared with the spinel type lithium-manganese-nickel-containing composite oxide powder (Comparative Example 1) that did not contain the crystalline phase.

As such, regarding the reason why a spinel type lithium-manganese-nickel-containing composite oxide powder containing a crystalline phase of $Ni_5MnO_4(BO_3)_2$ has an excellent discharge capacity retention ratio at a high temperature (for example, 45° C.), it is suspected that when a site having high activity at the surface of the spinel type lithium-manganese-nickel-containing composite oxide particles is covered with a composite oxide containing Ni, Mn and B, the reaction between the spinel type lithium-manganese-nickel-containing composite oxide and a liquid electrolyte can be suppressed, and as a result, the discharge capacity can be maintained even at a high temperature.

It is speculated that since such an effect is an effect attributable to the inclusion of a crystalline phase of $Ni_5MnO_4(BO_3)_2$, it can be said that the same applies to other 5 V class spinels having the same problem.

In addition, it was confirmed that in a case in which a 4 V class spinel type lithium-manganese-nickel-containing composite oxide or a lamellar lithium-manganese-nickel-containing composite oxide is produced by incorporating a boron compound into the raw material and calcining the mixture, when the lithium-manganese-nickel-containing composite oxide thus obtained is washed with water, the boron compound is eluted; however, in the case of the spinel type lithium-manganese-nickel-containing composite oxide powders (samples) obtained in Examples 1 to 16, there is almost no change in the boron content even when the powders are washed with water. From this, it was found that the operating mechanism of boron in the case of calcining a 4 V class spinel type lithium-manganese-nickel-containing composite oxide or a lamellar lithium-manganese-nickel-containing composite oxide having a boron compound incorporated into the raw material, is clearly different from the operating mechanism of boron in the case of calcining a 5 V class spinel type lithium-manganese-nickel-containing composite oxide having a boron compound incorporated into the raw material.

The invention claimed is:

1. A spinel type lithium-manganese-nickel-containing composite oxide having an operating potential of 4.5 V or higher with respect to a Li metal reference potential, wherein the spinel type lithium-manganese-nickel-containing composite oxide comprises a composite oxide phase comprising a crystalline phase of $Ni_5MnO_4(BO_3)_2$.

2. A spinel type lithium-manganese-nickel-containing composite oxide having an operating potential of 4.5 V or higher with respect to the Li metal reference potential, wherein the spinel type lithium-manganese-nickel-containing composite oxide comprises a crystalline phase in which a portion of Mn sites in $LiMn_2O_{4-\delta}$ are substituted with Li; another metal element M1, wherein M1 represents a metal element including at least one of Ni, Co and Fe and another metal element M2, wherein M2 represents a metal element including at least one of Mg, Ti, Al, Ba, Cr and Nb, wherein the spinel type lithium-manganese-nickel-containing composite oxide comprises a composite oxide phase comprising a crystalline phase of $Ni_5MnO_4(BO_3)_2$.

* * * * *